UNITED STATES PATENT OFFICE.

HENRY S. BLACKMORE, OF MOUNT VERNON, NEW YORK.

PROCESS OF MANUFACTURING HYDROGEN GAS.

SPECIFICATION forming part of Letters Patent No. 497,700, dated May 16, 1893.

Original application filed April 25, 1891, Serial No. 390,509. Divided and this application filed August 6, 1891. Renewed March 16, 1893. Serial No. 466,353. (No specimens.)

*To all whom it may concern:*

Be it known that I, HENRY S. BLACKMORE, a citizen of the United States, residing at Mount Vernon, in the county of Westchester and State of New York, have invented new and useful Improvements in the Process of Manufacturing Hydrogen Gas, of which the following is a specification.

I have discovered that hydrogen gas can be produced by the reaction of a caustic alkali in a state of fusion upon an alkaline formate, whereby the latter becomes decomposed into an alkaline carbonate and free hydrogen gas.

In carrying out my invention, I take an alkaline formate such for instance as sodium formate ($HCO_2Na$) and bring the same in contact with a caustic alkali, such for instance as caustic soda ($NaOH$) and the sodium formate becomes decomposed as follows:

$$(HCO_2Na + NaOH = Na_2CO_3 + H_2)$$

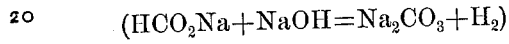

that is to say, I take for instance two hundred and twenty-seven pounds of sodium formate and bring the same in contact with one hundred and thirty-four pounds of caustic soda in a fused or volatile state and I obtain about three hundred and fifty-four pounds of sodium carbonate and twelve hundred and twenty-five cubic feet of free hydrogen gas.

In carrying out my invention in practice, I proceed as follows: I take carbonic oxide and heat the same in a suitable retort with a caustic alkali such as potash or soda, preferably the latter on account of its cheapness, to such a temperature that the caustic alkali becomes fused or volatilized. The fused or volatile caustic alkali, say for instance caustic soda ($NaOH$) reacts with carbonic oxide producing sodium formate thus:

$$(CO + NaOH = HCO_2Na)$$

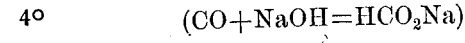

and by continuing the heat the following reaction takes place:

$$(HCO_2Na + NaOH = Na_2CO_3 + H_2;)$$

practically therefore I place two hundred and sixty-eight pounds of caustic soda into the retort and allow the same to react upon twelve hundred and fifty-two cubic feet of carbonic oxide and the final result which I obtain consists of twelve hundred and twenty-five cubic feet of hydrogen gas and three hundred and fifty-four pounds of sodium carbonate which is more or less contaminated with sodium formate and hydroxide. If the temperature is kept high throughout the operation, a large quantity of caustic alkali may be put into the retort and the carbonic oxide made to circulate continuously, until the caustic alkali is thoroughly carbonated when it is taken out and reconverted into caustic alkali for further operation. This reconversion can be effected by slaked lime in a manner well known to chemists.

Instead of using caustic soda I can use a mixture of caustic soda and caustic potash in carrying out the process above described.

I do not claim in this application for a patent the matter claimed in my application for a patent filed April 25, 1891, Serial No. 390,509, Patent No. 470,974, May 15, 1892, this present application being a division from the foregoing application.

What I claim as new, and desire to secure by Letters Patent, is—

1. The process of producing hydrogen gas which consists in bringing an alkaline formate in contact with a caustic alkali in a state of fusion, substantially as described.

2. The process of producing hydrogen gas which consists in forming an alkaline formate by the reaction of carbonic oxide upon a caustic alkali in a state of fusion and then continuing the reaction so as to decompose the alkaline formate into an alkaline carbonate and free hydrogen gas, substantially as described.

In testimony whereof I have hereunto set my hand in the presence of two subscribing witnesses.

HENRY S. BLACKMORE.

Witnesses:
J. VAN SANTVOORD,
E. F. KASTENHUBER.